UNITED STATES PATENT OFFICE.

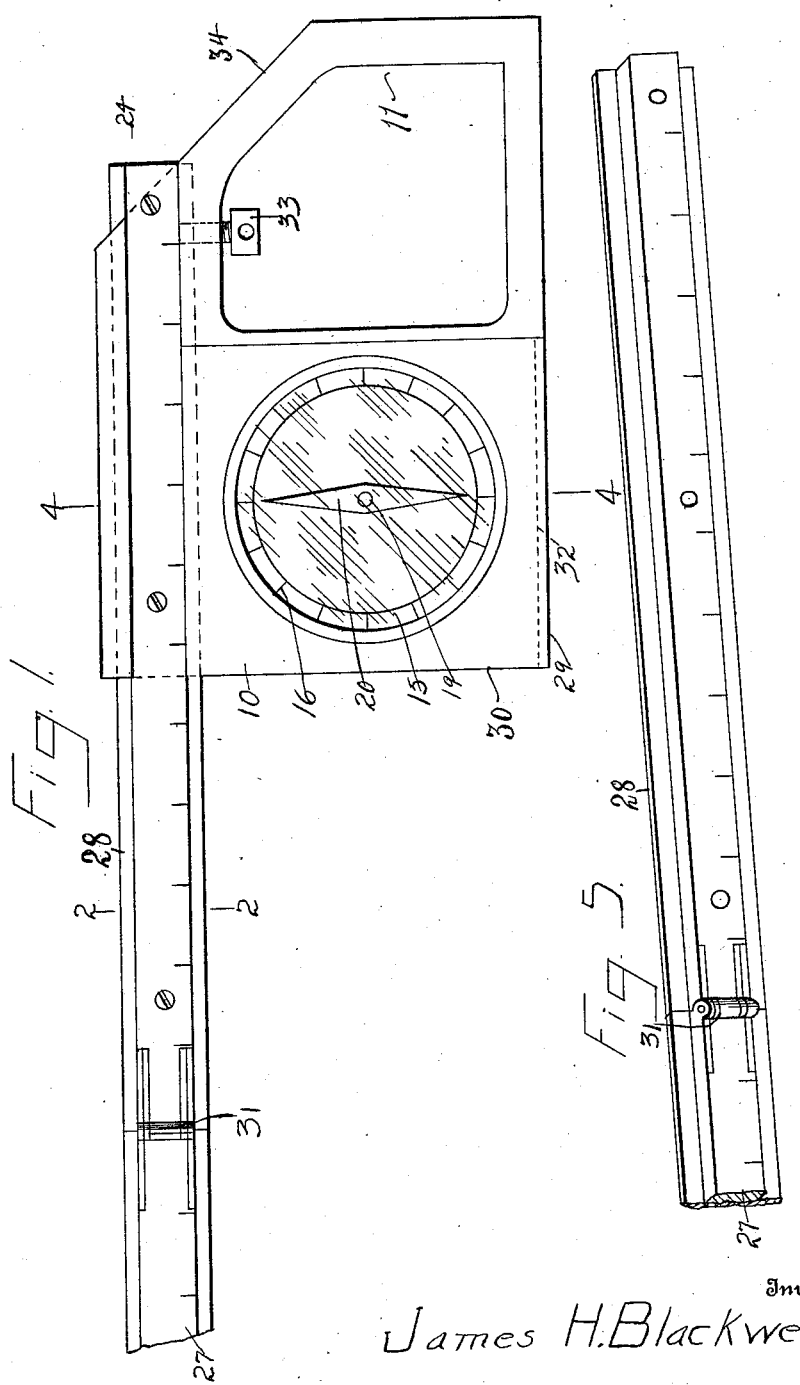

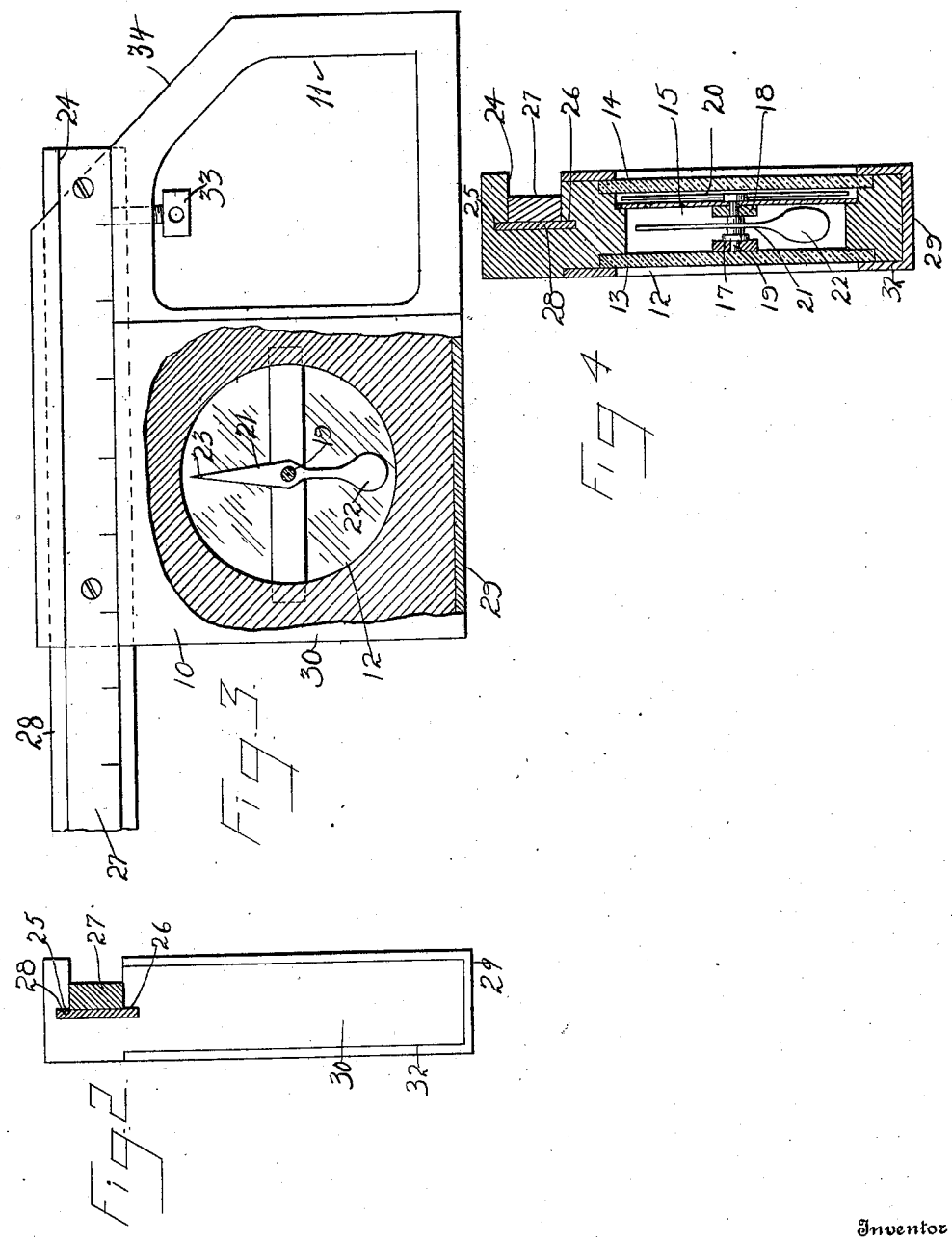

JAMES H. BLACKWELL, OF ROCHELLE, TEXAS.

COMBINED LEVEL AND TRY-SQUARE.

1,015,536.     Specification of Letters Patent.      Patented Jan. 23, 1912.

Application filed June 18, 1909. Serial No. 502,952.

*To all whom it may concern:*

Be it known that I, JAMES H. BLACKWELL, a citizen of the United States, residing at Rochelle, in the county of McCulloch, State of Texas, have invented certain new and useful Improvements in Combined Levels and Try-Squares; and I do hereby declare the following to be a full, clear, and exact description of the invention, such as will enable others skilled in the art to which it appertains to make and use the same.

This invention relates to combined levels, rules, and squares, and has for one of its objects to provide a simply constructed device which may be employed as a level, or as a square, particularly a try-square, and also as a miter implement.

With this and other objects in view, the invention consists in certain novel features of construction as hereafter shown and described and then specifically pointed out in the claim, and in the drawings illustrative of the preferred embodiment of the invention, Figure 1 is a side elevation of the improved implement. Fig. 2 is an end elevation with the combined rule and square blade in section on the line 2—2 of Fig. 1. Fig. 3 is a side elevation, partly in section, of the head portion of the improved device. Fig. 4 is a transverse section on the line 4—4 of Fig. 1. Fig. 5 is a perspective view of the combined level and square blade, detached.

The improved device comprises a head portion having a level indicating device, and a combined square blade and rule, the rule being adjustably connected to the head, and preferably foldable intermediate its ends to decrease the length of the implement when not in use.

The head portion of the implement is represented as a whole at 10 and formed with a hand grip portion 11 at one end. Formed through the body of the head 10 is an opening 12, preferably circular, and with shoulders at its opposite ends to receive glass plates 13—14, the plates designed to permit the "reading" of the leveling pointer, as hereafter explained. Located within the opening 12 is a disk 15 provided with graduations 16 representing divisions of a circle. Extending transversely of the opening 12 are spaced bars 17—18 in which a shaft 19 is mounted for rotation. The shaft extends at one end through the graduated disk 15 and is provided with a pointer 20, preferably double ended, the points of the indicator operating over or adjacent to the graduations 16, as shown in Fig. 1. Connected to the shaft 19 within the recess 12 is an arm 21 having a counterweight 22 at one end and extending into a pointer 23 at the opposite end. The member 21 being attached to the shaft 19, is maintained in its vertical position by the counterweight 22. The disk 15 is preferably provided with graduations upon both sides, so that both pointers 20—21 will indicate the level or inclination at which the body 10 is arranged. By this means the graduation may be read from either side of the implement, as will be understood.

Formed in the upper portion of the body 10 is a guide channel 24, the guide channel being formed with upwardly and downwardly directed extensions 25—26 at its inner side. A rule member 27 forms a part of the present invention and is designed to be slidably disposed in the guideway 24, and is provided with a plate 28 connected to its inner face, the plate operating at its edges in the extensions 25—26, as shown. The body 10 is formed with its lower face 29 and one end face 30 at right angles to each other, while the guideway 24 and its extensions 25—26 are arranged in parallel relations to the surface 29 and at right angles to the end 30, as shown. The surfaces 29—30 and the edges of the plate 28 are all machine dressed and "true" so that they may be employed as an effectual square, more particularly of the try-square order, as will be obvious.

The implement may thus be employed either as a square or as a level, as will be obvious, and is equally efficacious, in either capacity. The rule member 27 is preferably jointed as indicated at 31, so that the rule may be folded intermediate its ends to occupy less space when not in use. The member 10 and its hand grip 11 together with its guideway 24 is preferably formed in one single piece of wood and with a metal guard plate 32. A set screw 33 is provided to enable the rule member 27 to be clamped to the head member 10 when required.

The improved device is simple in construction can be inexpensively manufactured, and in various sizes, as required, and will be found useful for mechanics in connection with either wood or metal work.

The body 10 is formed with an inclined face 34 at its handle end, which may be employed to advantage in outlining "miters," the surface 34 being preferably a 45° angle, as shown.

What is claimed is:—

In an implement of the class described, the combination with a head formed with a try face at either end and with a longitudinal channel near one edge and opening through one side face thereof, of a two-part foldable scale slidable bodily in said channel, said channel being adapted to receive both parts of the scale when the latter is in folded position.

In testimony whereof, I affix my signature, in presence of two witnesses.

JAMES H. BLACKWELL.

Witnesses:
G. C. JONES,
J. C. RANNE.

Copies of this patent may be obtained for five cents each, by addressing the "Commissioner of Patents, Washington, D. C."